(12) United States Patent
Musy

(10) Patent No.: US 12,012,037 B2
(45) Date of Patent: Jun. 18, 2024

(54) VEHICLE INTERIOR TRIM PART HAVING OPTICAL FIBERS AND METHOD OF PRODUCING SAME

(71) Applicant: Faurecia Innenraum Systeme GmbH, Hagenbach (DE)

(72) Inventor: Maxime Musy, Karlsruhe (DE)

(73) Assignee: Faurecia Innenraum Systeme GmbH, Hagenbach (DE)

(*) Notice: Subject to any disclaimer, the term of this patent is extended or adjusted under 35 U.S.C. 154(b) by 0 days.

(21) Appl. No.: 18/056,689

(22) Filed: Nov. 17, 2022

(65) Prior Publication Data
US 2023/0161092 A1    May 25, 2023

(30) Foreign Application Priority Data

Nov. 24, 2021   (DE) .......................... 102021213244.8

(51) Int. Cl.
*F21V 8/00* (2006.01)
*B32B 5/02* (2006.01)
(Continued)

(52) U.S. Cl.
CPC ............... *B60Q 3/78* (2017.02); *B32B 5/022* (2013.01); *B32B 5/024* (2013.01); *B32B 5/275* (2021.05);
(Continued)

(58) Field of Classification Search
CPC . B60Q 3/60; B60Q 3/78; D03D 15/43; D03D 15/547; B32B 5/266; B32B 5/275;
(Continued)

(56) References Cited

U.S. PATENT DOCUMENTS 4,885,663 A * 12/1989 Parker .................... G02B 6/001
362/330
2009/0291606 A1   11/2009 Malhomme et al.
(Continued)

FOREIGN PATENT DOCUMENTS

| DE | 102012013105 A1 | 1/2014 |
| DE | 102013004002 A1 | 9/2014 |
| DE | 102018203856 A1 | 9/2019 |

OTHER PUBLICATIONS

"German Application Serial No. 102021213244.8, Search Report dated Jul. 22, 2022", 8 pgs.

*Primary Examiner* — Thomas M Sember
(74) *Attorney, Agent, or Firm* — Schwegman Lundberg & Woessner, P.A.

(57) ABSTRACT

The proposed vehicle interior trim part comprises a woven material having at least two parallel optical fibers that are able to laterally emit light and that extend in a longitudinal direction and having at least one further fiber and/or at least one further yarn. The vehicle interior trim part further comprises a reflective layer that is adjacent to the woven material and comprises a fleece material and that is configured to reflect light emitted by the at least two parallel optical fibers. The vehicle interior trim part additionally has a carrier that is adjacent to the reflective layer so that the reflective layer is located between the woven material and the carrier and having at least one light source that is optically connected to at least one of the at least two parallel optical fibers.

18 Claims, 3 Drawing Sheets

(51) Int. Cl.
*B32B 5/26* (2006.01)
*B32B 7/12* (2006.01)
*B32B 37/06* (2006.01)
*B32B 37/10* (2006.01)
*B60Q 3/60* (2017.01)
*B60Q 3/78* (2017.01)
*B60R 13/02* (2006.01)
*D03D 1/00* (2006.01)
*D03D 15/283* (2021.01)
*D03D 15/43* (2021.01)
*D03D 15/547* (2021.01)

(52) U.S. Cl.
CPC ............. *B32B 7/12* (2013.01); *B32B 37/06* (2013.01); *B32B 37/10* (2013.01); *B60Q 3/60* (2017.02); *D03D 1/00* (2013.01); *D03D 15/283* (2021.01); *D03D 15/43* (2021.01); *D03D 15/547* (2021.01); *B32B 5/266* (2021.05); *B32B 2262/0246* (2013.01); *B32B 2262/0276* (2013.01); *B32B 2305/188* (2013.01); *B32B 2305/20* (2013.01); *B32B 2307/416* (2013.01); *B32B 2323/10* (2013.01); *B32B 2333/12* (2013.01); *B32B 2367/00* (2013.01); *B32B 2605/003* (2013.01); *B60R 13/02* (2013.01); *D10B 2321/022* (2013.01); *D10B 2321/08* (2013.01); *D10B 2331/04* (2013.01); *D10B 2401/20* (2013.01); *D10B 2505/12* (2013.01)

(58) Field of Classification Search
CPC ........... B32B 7/12; B32B 37/06; B32B 37/10; B32B 2305/188; B32B 2305/20; B32B 2307/416; B32B 2323/10; B32B 2333/12; B32B 2367/00; B32B 2605/003; D10B 2401/20; D10B 2505/12
See application file for complete search history.

(56) References Cited

U.S. PATENT DOCUMENTS

| | | | |
|---|---|---|---|
| 2011/0269358 A1* | 11/2011 | Peng | D03D 15/547 442/59 |
| 2016/0299276 A1* | 10/2016 | Yamamoto | G02B 6/001 |
| 2018/0340684 A1* | 11/2018 | Yamada | D03D 15/547 |
| 2021/0207790 A1* | 7/2021 | Hsu | D03D 15/547 |

* cited by examiner

VEHICLE INTERIOR TRIM PART HAVING OPTICAL FIBERS AND METHOD OF PRODUCING SAME

CLAIM FOR PRIORITY

This application claims the benefit of priority of German Application No. 10 2021 213 244.8, filed Nov. 24, 2021, which is hereby incorporated by reference in its entirety.

TECHNICAL FIELD

The present disclosure relates to a vehicle interior trim part that comprises a woven fabric having optical fibers and to a method of producing said vehicle interior trim part.

BACKGROUND

In modern vehicle interiors, such vehicle interior trim parts including optical fibers can, for example, form center consoles, door panels, or dashboards.

US 2009/0291606 A1, for example, relates to an illuminating complex that includes a textile woven fabric having optical fibers and a carrier. The fibers are held in their positions by binding yarns to attach the textile woven fabric to the carrier, wherein connection layers can be arranged between the textile woven fabric and the rigid carrier.

SUMMARY/OVERVIEW

Vehicle interior trim parts including these optical fibers can have a small light emission capability in a vehicle interior and in particular require a complex manufacture.

The vehicle interior trim part can furthermore be exposed to mechanical strain and/or high pressure during a manufacturing process and/or during use. The sensitive optical fibers can hereby be damaged such that a light emission and/or an optical appearance is/are impaired. The distribution of the emitted light can in particular become inhomogeneous.

It is therefore an aim of the present disclosure to propose a vehicle interior trim part that is simple to produce and that has an improved light emission capability and an improved resistance. It is also an aim of the present disclosure to provide a method of producing such a vehicle interior trim part.

The proposed vehicle interior trim part comprises:

a woven fabric having at least two parallel optical fibers that are able to laterally emit light and that extend in a longitudinal direction and having at least one further fiber and/or at least one further yarn;

a reflective layer that is adjacent to the woven fabric and comprises a fleece material and that is configured to reflect light emitted by the at least two parallel optical fibers;

a carrier that is adjacent to the reflective layer so that the reflective layer is located between the woven fabric and the carrier; and at least one light source that is optically connected to at least one of the at least two parallel optical fibers.

The optical fibers emit light in a lateral direction and thus away from the longitudinal direction of the fibers. The lateral emission of the light enables an appealing light emitting design or illumination of the visible part of the vehicle interior trim part. The reflective layer can be indirectly or directly adjacent to the woven fabric. If the reflective layer is indirectly adjacent to the woven fabric, this permits a certain distance between the reflective layer and the woven fabric so that an adhesive layer or a spacer can be arranged between the reflective layer and the woven fabric, but with such a distance not being obligatory. The reflective layer is located between the carrier and the woven fabric, and indeed such that the carrier is adjacent to the reflective layer. The reflective layer is typically directly adjacent to the carrier, with the reflective layer at least partially contacting the carrier. Alternatively, an intermediate layer, for example an adhesive layer, can be located between the reflective layer and the carrier.

The reflective layer can in particular be configured to reflect visible light. The reflective light can increase an emission capability of the vehicle interior trim part into a vehicle interior in that the light emitted in the carrier direction by the optical fibers is at least partially reflected into the vehicle interior at the reflection layer. A smaller number of optical fibers can thereby be sufficient to achieve a desired emission capability of the vehicle interior trim part.

The reflective layer can in particular have a smooth surface to reflect the emitted light by means of directed reflection or can have a rough surface to reflect the emitted light diffusely.

In some embodiments, the fleece material comprises two different thermoplastic materials. A mixture is advantageous that comprises a first thermoplastic material and a second thermoplastic material. The first thermoplastic material can, for example, have good mechanical properties and the second thermoplastic material can have good processing properties.

The first thermoplastic material can advantageously have a higher melting or softening temperature than the second thermoplastic material. The first thermoplastic material can be or comprise polyester or polyamides and the second thermoplastic material can be or comprise polypropylene.

In some embodiments, the reflective layer can comprise a reflective coating and/or reflective particles in addition to the fleece material. The fleece material can comprise antipilling fleece, cotton fleece, softshell fleece, knitted fleece, double faced fleece, and/or wellness fleece. The fleece material can have an area density between 5 g/cm² and 5000 g/cm², preferably between 20 g/cm² and 1000 g/cm², particularly preferably between 50 g/cm² and 500 g/cm².

The fleece material can in particular be elastic. The elasticity of the fleece material can enable a better force distribution on a blow, in particular a low or high local pressure on the woven fabric. This has the advantage that the fleece material can absorb loads that are exerted on the woven fabric.

Damage to the optical fibers can thus be avoided and a surface of the optical fibers can be protected. The fleece material can have a Young's modulus between 0.01 GPa and 500 GPa, preferably between 1 GPa and 200 GPa. The vehicle interior trim part can have advantageous, in particular soft, haptics due to the elasticity of the fleece material.

An optical fiber typically includes a core layer and a jacket layer and is designed such that an outer periphery of the core layer is covered by the jacket layer. Refractive indices and degrees of reflection can accordingly be selected on the basis of selected materials for the core layer and the jacket layer such that a light guidance in the core layer is possible by means of total reflection at the jacket layer. The optical fibers are, at least partially, configured as laterally emitting optical fibers to in particular emit light from the side surfaces in a suitable manner. This can be achieved, for example, in that scattering particles are mixed into the core layer and/or in that the jacket layer is locally removed or roughened. The local removal or roughening has the advantage that a light pattern can be generated.

The yarn can be defined as a fiber that is parallel or primarily parallel—extending in the longitudinal direction—and that is arranged between the at least two optical fibers. In an embodiment, the at least one yarn has a greater width than one of the at least two optical fibers in the transverse direction. If a compressive force is exerted on the woven fabric in a transverse direction, the fibers of the at least one yarn can thus move with respect to one another and can at least partially slide over one another such that the transverse compressive force can be absorbed and the optical fibers can be protected. In the event that a transverse pulling force is exerted on the woven fabric, the fibers of the at least one yarn, that lie over one another, can slide apart in a plane. A yarn can thus change its shape since the fibers can move with respect to one another. This has the advantage that the at least one yarn can absorb loads that are exerted on the woven fabric. Damage to the optical fibers can thus be avoided and a surface of the optical fibers can be protected.

In an embodiment, the woven fabric has at least two yarns of primarily parallel fibers and at least one of the at least two optical fibers is arranged between the at least two yarns of primarily parallel fibers. In an embodiment, exactly one of the at least two optical fibers is arranged between two yarns of primarily parallel fibers. In a different embodiment, exactly four of the at least two optical fibers are arranged between two yarns of primarily parallel fibers. In a further embodiment, a plurality of the at least two optical fibers are arranged between two yarns of primarily parallel fibers. The primarily parallel fibers can preferably comprise a synthetic material such as polypropylene, polyamide, polyethylene, and/or polyester.

A diameter of the optical fiber can amount to at least 0.1 mm, preferably at least 0.5 mm. A diameter of the optical fiber can amount to at most 3 mm, preferably at most 1 mm. The optical fibers can preferably comprise or consist of a polymer such as polymethyl methacrylate (PMMA), polycarbonate (PC), polystyrene (PS), and/or glass. The optical fibers can, however, also comprise different optical materials. This makes a desired light emission capability possible at relatively low cost.

The at least one light source can comprise sunlight, a laser diode, an incandescent lamp, a halogen lamp, a luminescent material, a gas discharge tube, and/or an electroluminescent film.

In an embodiment, the carrier comprises or consists of NFPP (a composite material having natural fiber and polypropylene), polypropylene (PP), and/or ABS/PC. The carrier can furthermore comprise a metal, e.g. aluminum, carbon fibers, or glass fibers.

The fleece material can furthermore consist of or comprise non-wove polyester. A polymer having an ester function in its main chain can be understood as a polyester here. The fleece material can in particular be understood as a synthetic knitted felt. The fleece material is typically not a fabric, but rather knitwear and can be machine knit, for example. In other embodiments, the fleece material can consist of cotton.

An adhesive layer can be arranged between the woven fabric and the reflective layer. In some embodiments, the adhesive layer can completely cover the woven fabric and the reflective layer. In these embodiments (with an adhesive layer), the reflective layer is indirectly adjacent to the woven fabric. In further embodiments, the adhesive layer can only partially cover the woven fabric and the reflective layer. The adhesive layer can comprise an adhesive or a resin. The adhesive can comprise an organic and/or inorganic adhesive. In other embodiments, the woven fabric can be sewn to the reflective layer. In these other embodiments, the reflective layer can be directly adjacent to the woven fabric.

The reflective layer can have a degree of reflection, in particular in the visible light spectrum, of at least 0.1, preferably of at least 0.3, particularly preferably at least 0.7. The reflective layer can preferably consist of a material and/or comprise a coating that has/have a particularly high degree of reflection. The reflective layer can furthermore have a color having a particularly high degree of reflection such as the colors white, beige, or light gray. The degree of reflection preferably relates to the wavelength range of the visible light. It can amount to 400 nm to 800 nm, for instance.

The vehicle interior trim part can furthermore comprise a light permeable top layer that at least partially covers the woven fabric. The top layer can be formed from a light permeable material. The top layer can be formed from a perforated light impermeable material or from a light permeable textile. The top layer preferably comprises first and second sides, with the first side being configured for illumination or to output the light emitted by the optical fiber and the second side being configured to absorb the light emitted by the optical fiber. The first side can form a front side of the top layer and the second side can form a rear side of the top layer. The optical fibers can be arranged on the second side, in particular at the rear side of the top layer.

The top layer can in particular at least partially cover a front side of the woven fabric. Physical damage to the optical fibers can thereby be prevented. The top layer can in particular be configured as a decorative layer that has appealing haptics and/or an appealing pattern. In this case, the woven fabric can be configured as background lighting for the top layer.

The top layer can furthermore be produced from a flexible material. A flexible material increases the design freedoms on the installation, positioning, and use of the vehicle interior trim part. The adhesive layer can comprise a lacquer or a resin. The top layer can, for example, be connected to the woven fabric by a spray coating processing. In another embodiment, the top layer can comprise a solid transparent material, e.g. glass, PMMA, or polycarbonate. In this case, the top layer can be mechanically attached to the woven fabric, for example by using clamps, screws, or an adhesive. In another embodiment, the top layer can comprise textile fibers to provide the vehicle interior trim part with a textile appearance. Textile fibers are a particularly well suited flexible material. They are inexpensive in production and their processing can be handled easily. The textile fibers can preferably comprise a synthetic material such as polypropylene, polyamide, polyethylene, and/or polyester. However, natural fibers such as animal wools, cotton, and/or hemp can also be used as textile fibers. The top layer can comprise a fleece.

The optical fibers can be woven into the top layer, in particular woven to the plurality of textile fibers. Transverse fibers can be provided, for example. The transverse fibers can be configured to fasten the optical fibers to the top layer to enable a weaving of the optical fibers with the top layer. The transverse fibers can consist of polyester, polypropylene, or polyamide or can comprise one or a combination of these plastics. The vehicle interior trim part can be produced particularly simply and inexpensively by the weaving of the fibers into or with the top layer. The optical fibers can in particular have different lengths and can be woven with the top layer in different manners to provide a lighting pattern.

The top layer can furthermore comprise a pattern or a patterning that is configured to be visible in an unlit state of the top layer and/or in a lit state of the top layer. The transverse fibers can likewise be textile fibers.

The top layer can be transparent, semitransparent, and/or colored. The top layer can have a degree of transmission of at least 0.01, preferably of at least 0.03, particularly preferably at least 0.07. The top layer can have a degree of transmission of at most 0.8, preferably of at most 0.5. A low degree of transmission can be advantageous in some embodiments since the underlying woven fabric (seen from the vehicle interior) is only visible in these embodiments when the optical fibers emit light. A high degree of transmission is advantageous when the top layer is a protective layer. The degree of transmission preferably relates to the wavelength range of the visible light. It can amount to 400 nm to 800 nm, for instance.

The above-named light permeable top layer can be designed as a light permeable light diffusion layer. A particular optical property of a light diffusion layer is that the output light is more homogeneously distributed.

In other embodiments, the vehicle interior trim part can comprise both a light permeable top layer and a light permeable light diffusion layer. In such embodiments, the light diffusion layer can be arranged between the woven fabric and the top layer. The light diffusion layer preferably comprises first and second sides, with the first side being configured for illumination or to output the light emitted by the optical fiber and the second side being configured to absorb the light emitted by the optical fiber. The first side can form a front side of the light diffusion layer and the second side can form a rear side of the light diffusion layer. The optical fibers can be arranged on the second side, in particular at the rear side of the light diffusion layer. The top layer can be arranged on the first side, in particular at the front side of the light diffusion layer.

In further embodiments, the vehicle interior trim part can comprise at least a further binding yarn. The binding yarn can extend substantially perpendicular to the longitudinal direction and can connect the optical fibers to the at least one further fiber and/or the at least one further yarn.

The optical fibers and the further fibers can extend in the weft direction and the at least one further binding yarn can extend in the warp direction. In this way, the optical fibers and further fibers can be held in a tight position with respect to one another and this makes possible a variation of the geometry of the optical fibers and the further fibers. The at least one further binding yarn can, however, also extend in the weft direction while the optical fibers and further fibers extend in the warp direction. The optical fibers can in this manner be positioned at predetermined specific distances.

The at least one further fiber and/or the at least one further yarn can be thicker than one of the at least two optical fibers, preferably at least twice as thick, particularly preferably at least three times as thick. The thickness can be understood as a width in the transverse direction, in particular a yarn thickness. The yarn thickness can be understood as a diameter of the yarn. This has the advantage that the yarn can absorb loads that are exerted on the woven fabric. Damage to the optical fibers can thus be avoided and a surface of the optical fibers can be protected. In other embodiments, the one further yarn can be thinner than the optical fibers.

The optical fibers can furthermore have a rough surface at least regionally. A rough surface can thereby be implemented in that a surface layer of the fibers is removed in regions. The light is emitted in the lateral direction of the fibers, away from the longitudinal direction, through that part of the surface at which the surface layer has been removed.

A bundle of the optical fibers can furthermore be optically connected to at least one of the at least one light sources.

A bundle of optical fibers can comprise at least 2 optical fibers, preferably at least 10 optical fibers. The optical fibers of the bundle can be arranged in a cylindrical form.

Provision can in particular be made that only one bundle of optical fibers is optically connected to the at least one light source. In other embodiments, two bundles of optical fibers are optically connected to two light sources. A plurality of bundles of optical fiber can further be optically connected to a plurality of light sources, with each respective bundle only being optically connected to one light source. A number of light sources can thereby be minimized.

The woven fabric can be a Jacquard textile and/or a maille textile and/or an ottoman textile. A textile can be understood as a Jacquard textile or a maille textile or an ottoman textile that was manufactured by a Jacquard patterning or a maille patterning or an ottoman patterning. The Jacquard, maille, and/or ottoman textile can have more than 2 differently colored fibers, preferably more than 4 differently colored fibers. Particularly appealing weaving patterns can thereby be achieved. The Jacquard textile can in particular be knitted, stitched, and/or crocheted.

A textile having a rib weave can be understood as an ottoman textile. Rib weave can be understood in binding theory of a weaving mill as a derivative of linen binding in which a longitudinally or transversely extending, ribbed surface structure is produced. With warp ribs, also called transverse ribs, the warp density, i.e. the number of warp threads per centimeter, is increased so much that the weft threads thereunder disappear. With weft ribs, also called longitudinal ribs, the fabric appearance in color and material is only determined by the weft material.

A method of producing a vehicle interior trim part is furthermore provided that comprises the following steps: weaving at least one woven fabric having at least two parallel optical fibers that are able to laterally emit light and that extend in a longitudinal direction and having at least one further fiber and/or at least one further yarn; arranging the woven fabric on a reflective layer that comprises a fleece material and is configured to reflect light emitted by the at least two parallel optical fibers; and arranging the reflective layer on a carrier, with a laminate of the woven fabric and the reflective layer being connected to the carrier by hot pressing.

The carrier can furthermore be brought into a desired shape by a hot pressing step. The laminate can preferably be connected to the carrier by hot pressing during the shaping of the carrier. The fleece material can protect sensitive fibers of the woven fabric, for example PMMA optical fibers, from extreme heat. An embodiment is particularly advantageous in which the fleece material comprises a thermoplastic material that melts during the hot pressing. The reflective layer can adhere to the carrier by the melted material of the reflective layer. It is thereby not necessary to arrange a further adhesive layer between the carrier and the laminate, whereby a production complexity of the vehicle interior trim part can be reduced. It is also possible to use the thermoplastic material as an adhesive agent that adheres the woven fabric and the carrier to one another.

Provision can furthermore be made that the optical fibers are roughened before the weaving of the at least one woven fabric. The optical fibers can in particular be roughened using a sand blast.

In this manner, a roughening and/or removal of the jacket layer of the optical fibers can be effected particularly simply and precisely.

BRIEF DESCRIPTION OF THE FIGURES

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
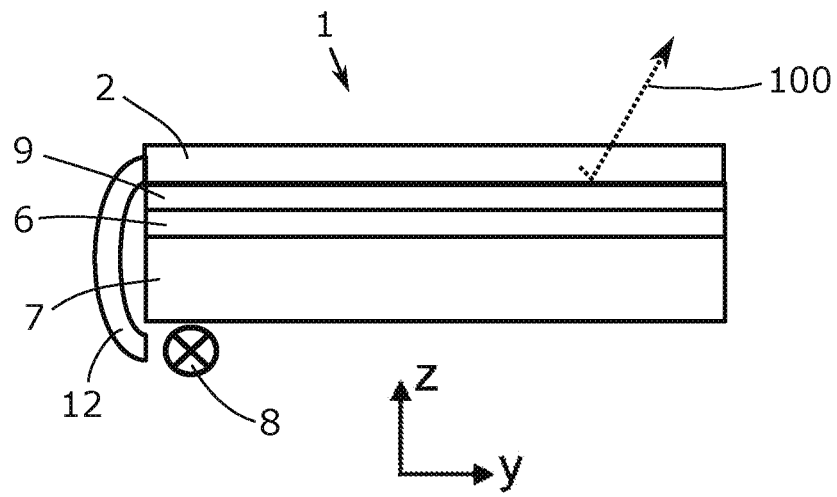
FIG. 1 illustrates an example of a cross-sectional representation of a first embodiment of a vehicle interior trim part.

Repeating and similar features of different embodiments are provided with identical or similar alphanumeric reference numerals in the Figures.

FIG. 1 shows a cross-sectional representation of a first embodiment of a vehicle interior trim part 1.

The vehicle interior trim part 1 comprises a woven fabric 2 and a reflective layer 6 that is arranged below the woven fabric 2 (with respect to the z direction). The reflective layer 6 is adhered to the woven fabric 2 by means of an adhesive layer 9. The adhesive layer 9 is arranged between the woven fabric 2 and the reflective layer 6. The adhesive layer 9 here completely covers the woven fabric 2 and the reflective layer 6.

Figure 3:
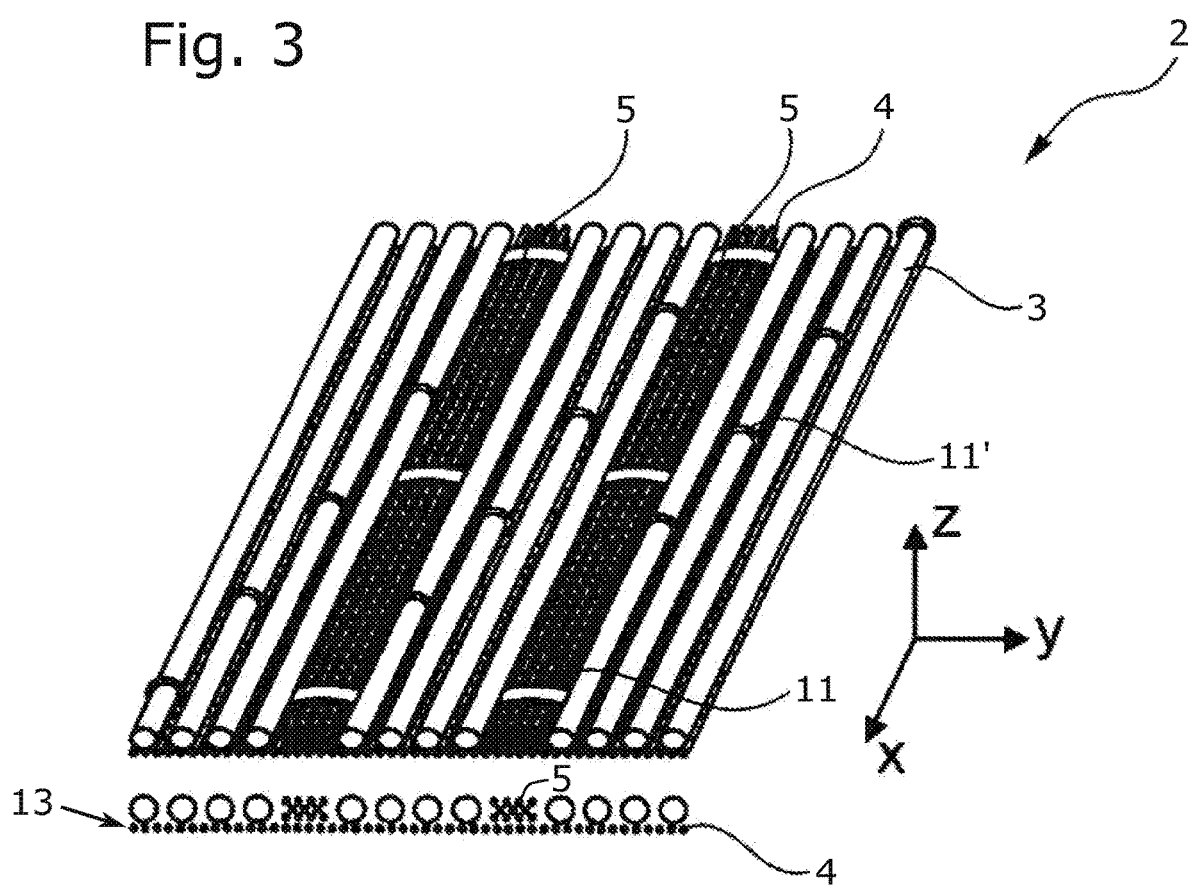
FIG. 3 illustrates an example of a perspective plan view of a woven fabric.

The reflective layer 6 is configured such that it reflects the light emitted by the woven fabric 2 (in particular by the optical fibers 3 of the woven fabric, see FIG. 3) in the direction (z direction in FIG. 1) of a vehicle interior. A light path 100 is shown in simplified form by way of example in FIG. 1.

The reflective layer 6 has a degree of reflection of at least 0.1, preferably of at least 0.3, particularly preferably at least 0.7. The degree of reflection relates to the wavelength range of the visible light. It can amount to 400 nm to 800 nm, for instance. The reflective layer 6 consists of a fleece material, in particular of a non-woven polyester.

The vehicle interior trim part 1 further comprises a carrier 7 that is fastened to the reflective layer 6. The reflective layer 6 has a direct contact with the carrier 7 here. The reflective layer 6 can possibly be fastened to the carrier 7 by an adhesion layer (not shown). A light source 8 is furthermore arranged that is optically connected to the optical fibers 3. A bundle 12 of optical fibers 3 is in particular optically connected to the light source 8 in FIG. 1. The light source 8 is preferably arranged below the carrier 7. The light source 8 can, however, also be arranged laterally, outside the field of vision of a vehicle occupant.

Figure 2:
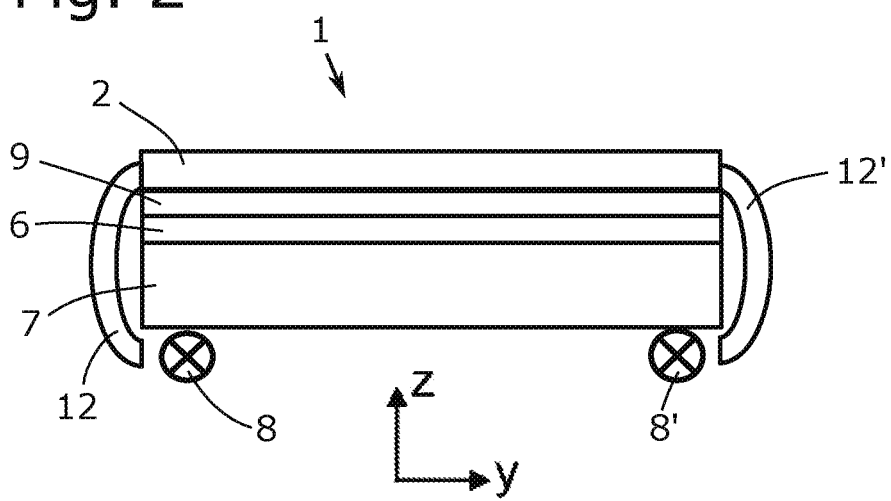
FIG. 2 illustrates an example of a cross-sectional representation of a second embodiment of a vehicle interior trim part.

FIG. 2 shows a different embodiment in which (unlike the embodiment from FIG. 1) two bundles 12 and 12' of optical fibers 3 are optically connected to two light sources 8 and 8'. Provision can be made here that only one of the two light sources 8 or 8' emits light into the optical fibers 3 during an operation of the vehicle interior trim part 1. It is also possible that a vehicle occupant has the choice of which light source 8 should emit light.

FIG. 3 shows a perspective plan view of the woven fabric 2. FIG. 3 shows a woven fabric 2 that has optical fibers 3 and parallel fibers 4. The optical fibers 3 are arranged in parallel with one another and extend in a longitudinal direction that is defined as the x direction. The parallel fibers 4 are arranged in parallel with the optical fibers 3 in the longitudinal direction. The parallel fibers 4 form two yarns 5. Four optical fibers 3 are arranged next to one another between the two yarns 5. In other embodiments, the number of optical fibers 3 can be different. In the example of FIG. 3, every yarn 5 has eleven parallel fibers 4. The parallel fibers 4 in a yarn 5 are arranged in three layers, with two layers having four parallel fibers 4 and one layer having three parallel fibers 4 in a plane. In other embodiments, the number of parallel fibers 4 and the number of layers can be different. A fiber 4 has a diameter of approximately 0.3 mm. An optical fiber 3 has a diameter of approximately 1 mm. The woven fabric 2 furthermore has an additional layer 13. In this Figure, only parallel fibers 4 can be recognized. The additional layer 13 can, however, be a fabric having yarns or fibers both in the warp direction and in the weft direction. The optical fibers 3 and the yarns 5 are arranged above the additional layer 13. Further binding yarns 11 are braided between the at least two parallel optical fibers 3 and the at least one yarn 5 on parallel fibers 4. In the embodiment illustrated, the one further binding yarn 11 is woven in the weft direction and the optical fibers 3 and the parallel fibers 4 are arranged in the warp direction. The optical fibers 3 and the yarns 5 are hereby held in their mutually parallel positions due to the further binding yarns 11 that are periodically woven, but are not necessarily alternately woven with the optical fibers 3 and the yarn 5. A different yarn 11' is not periodically woven with the optical fibers 3 and the yarn 5. The binding yarns 11 and 11' extend in a transverse direction, that is defined as the y direction, substantially perpendicular to the extension of the optical fibers 3 and the parallel fibers 4 in the longitudinal direction. The optical fibers 3 comprise polymethyl methacrylate. The parallel fibers 4 comprise or consist of polypropylene. The binding yarns 11 and 11' comprise polypropylene and polyester.

The further yarn 5 in FIG. 3 is thicker than an optical fiber 3. The thickness of the yarn or the thickness of an optical fiber 3 is to be understood as a spatial extent in the z direction.

The woven fabric 2 can be a Jacquard textile and/or a maille textile and/or an ottoman textile. A textile can be understood as a Jacquard textile or a maille textile or an ottoman textile that was manufactured by a Jacquard patterning or a maille patterning or an ottoman patterning. The Jacquard, maille, and/or ottoman textile can have more than 2 differently colored fibers 4, preferably more than 4 differently colored fibers 4.

Figure 4:
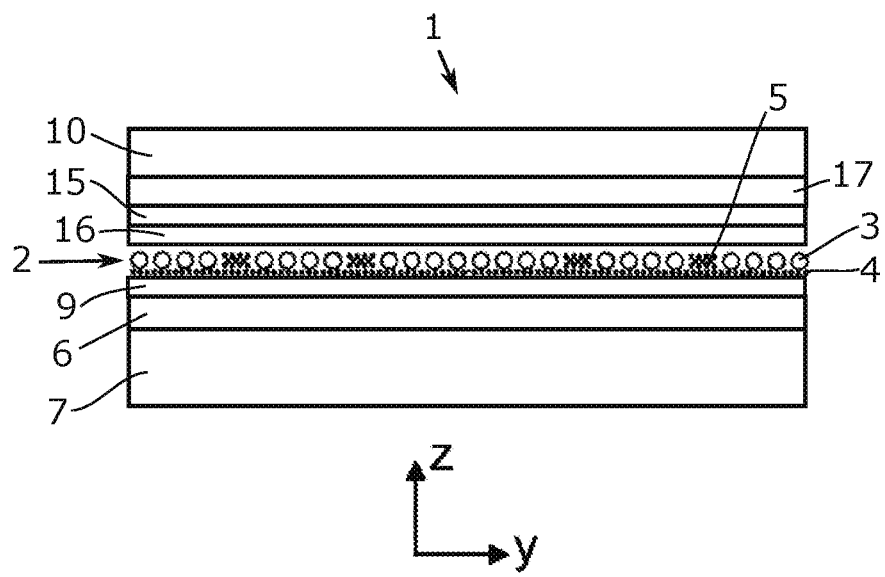
FIG. 4 illustrates an example of a cross-sectional representation of a third embodiment of a vehicle interior trim part.

FIG. 4 shows a cross-sectional representation of a third embodiment of a vehicle interior trim part 1. The optical fibers 3, the yarns 5, and the fibers 4 extend in parallel with one another in the x direction. In comparison with the embodiment of FIG. 1, the vehicle interior trim part 1 comprises a light permeable top layer 10 and a light permeable light diffusion layer 15 that cover the woven fabric 2.

The top layer 10 comprises first and second sides, with the first side being configured for illumination or to output the light emitted by the optical fibers 3 and the second side being configured to absorb the light emitted by the optical fibers 3. The first side is a front side of the top layer 10 and the second side is a rear side of the top layer 10. The optical fibers 3 are arranged on the second side. The top layer 10 completely covers a front side of the woven fabric 2. The top layer 10 is adhered to the light permeable light diffusion layer 15 by an adhesive layer 17. The top layer 10 can have a degree of transmission of at least 0.1, preferably of at least 0.3, particularly preferably at least 0.7. The degree of transmission relates to the wavelength range of the visible light.

The light diffusion layer 15 has first and second sides. The first side is a front side of the light diffusion layer 15 and the second side is a rear side of the light diffusion layer 15. The optical fibers 3 are arranged on the second side, in particular at the rear side of the light diffusion layer 15. The top layer 10 can be arranged on the first side, in particular at the front side of the light diffusion layer 15. The light diffusion layer 15 is adhered to the woven fabric 2 by an adhesive layer 16. The light diffusion layer 15, the adhesive layer 16, and the adhesive layer 17 can have a degree of transmission of at least 0.1, preferably of at least 0.3, particularly preferably at least 0.7. The degree of transmission relates to the wavelength range of the visible light.

Figure 5:
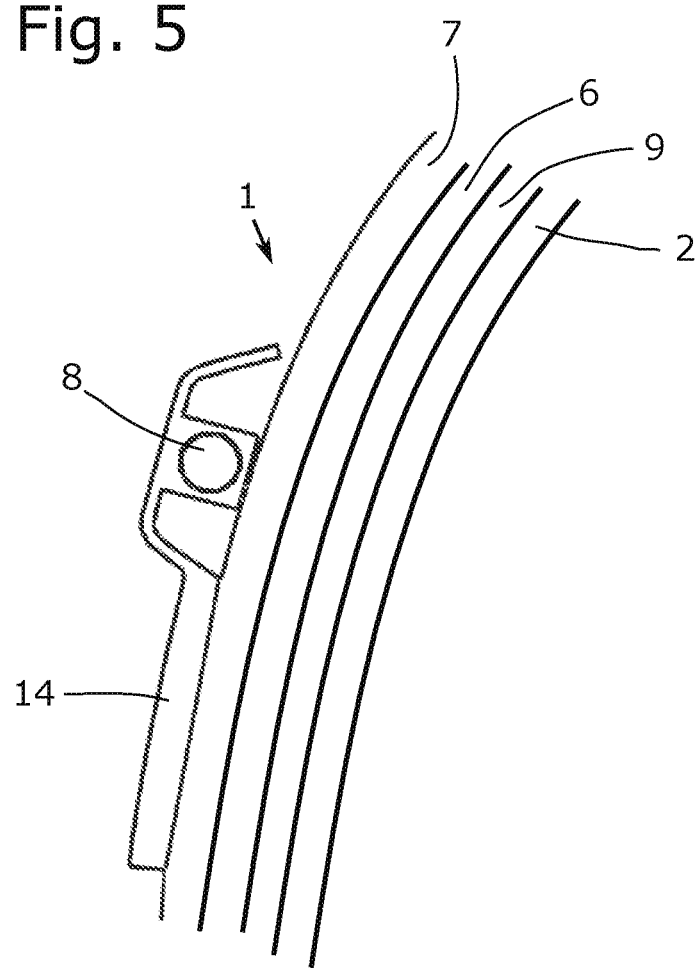
FIG. 5 illustrates an example of a cross-sectional representation of a fourth embodiment of a vehicle interior trim part.

FIG. 5 shows a cross-sectional representation of a fourth embodiment of a vehicle interior trim part 1. The vehicle interior trim part 1 of FIG. 5 has a curved region. Such vehicle interior trim parts 1 can, for example, form parts of center consoles, door panels, or dashboards. The vehicle interior trim part 1 additionally has a light source holder 14. The light source holder 14 can in particular consist of plastic and is arranged on a side of the carrier 7 remote from the vehicle interior.

What is claimed is:

1. A vehicle interior trim part comprising:
   a woven material having at least two parallel optical fibers that laterally emit light and extend in a longitudinal direction, wherein the woven material has at least one of: at least one further fiber or at least one further yarn;
   a reflective layer adjacent to the woven material that comprises a fleece material, wherein the fleece material comprises a first thermoplastic material and a second thermoplastic material different from the first thermoplastic material, and wherein the reflective layer is configured to reflect light emitted by the at least two parallel optical fibers;
   a carrier adjacent to the reflective layer such that the reflective layer is located between the woven material and the carrier; and
   at least one light source that is optically connected to at least one of the at least two parallel optical fibers.

2. The vehicle interior trim part in accordance with claim 1, wherein the reflective layer is adhered to the woven material by an adhesive layer.

3. The vehicle interior trim part in accordance with claim 1, wherein the reflective layer has a degree of reflection of at least 0.1.

4. The vehicle interior trim part in accordance with claim 1, wherein the reflective layer has a degree of reflection of least 0.3.

5. The vehicle interior trim part in accordance with claim 1, wherein the reflective layer has a degree of reflection of at least 0.7.

6. The vehicle interior trim part in accordance with claim 1, wherein at least one of a light permeable top layer or a light permeable light diffusion layer at least partially covers the woven material.

7. The vehicle interior trim part in accordance with claim 1, wherein at least one further binding yarn extends substantially perpendicular to the longitudinal direction connects the at least two parallel optical fibers to at least one of the at least one further fiber or to the at least one further yarn.

8. The vehicle interior trim part in accordance with claim 1, wherein at least one of the at least one further fiber or the at least one further yarn is thicker than one of the at least two parallel optical fibers.

9. The vehicle interior trim part in accordance with claim 1, wherein at least one of the at least one further fiber or the at least one further yarn is at least twice as thick as the at least two parallel optical fibers.

10. The vehicle interior trim part in accordance with claim 1, wherein at least one of the at least one further fiber or the at least one further yarn is at least three times as thick as the at least two parallel optical fibers.

11. The vehicle interior trim part in accordance with claim 1, wherein at least a portion of a surface of the at least two parallel optical fibers is rough textured.

12. The vehicle interior trim part in accordance with claim 1, wherein the woven material comprises at least one of: a Jacquard textile, a maille textile, or an ottoman textile.

13. A method of producing a vehicle interior trim part comprising the following steps:
   weaving at least a woven material having at least two parallel optical fibers that laterally emit light and extend in a longitudinal direction, and at least one of: at least one further fiber or at least one further yarn;
   arranging the woven material on a reflective layer, wherein the reflective layer comprises a fleece material and is configured to reflect light emitted by the at least two parallel optical fibers, and wherein the fleece material comprises a first thermoplastic material and a second thermoplastic material different from the first thermoplastic material; and
   arranging the reflective layer on a carrier, wherein a laminate of the woven material and the reflective layer are connected to the carrier by hot pressing.

14. The method according to claim 13, wherein the reflective layer has a degree of reflection of at least 0.1.

15. The method according to claim 13, wherein the reflective layer has a degree of reflection of least 0.7.

16. A vehicle interior trim part comprising:
   a woven material having at least two parallel optical fibers that laterally emit light and extend in a longitudinal direction, wherein the woven material has at least one of: at least one further fiber or at least one further yarn;
   a reflective layer adjacent to the woven material that comprises a fleece material, wherein the reflective layer is configured to reflect light emitted by the at least two parallel optical fibers, and wherein the fleece material comprises a first thermoplastic material and a second thermoplastic material different from the first thermoplastic material;
   a carrier adjacent to the reflective layer such that the reflective layer is located between the woven material and the carrier, wherein the reflective layer is adhered to the woven material by an adhesive layer, and wherein the reflective layer has a degree of reflection of at least 0.1; and at least one light source that is optically connected to at least one of the at least two parallel optical fibers.

17. The vehicle interior trim part of claim 16, wherein at least one of a light permeable top layer or a light permeable light diffusion layer at least partially covers the woven material.

18. The vehicle interior trim part of claim 16, wherein at least one further binding yarn extends substantially perpendicular to the longitudinal direction connects the at least two parallel optical fibers to at least one of the at least one further fiber or to the at least one further yarn.

* * * * *